(12) United States Patent
Chang

(10) Patent No.: US 6,763,313 B2
(45) Date of Patent: Jul. 13, 2004

(54) SYSTEM AND METHOD FOR MEASURING AN OBJECT

(75) Inventor: Chih-Kuang Chang, Tu-Chen (TW)

(73) Assignee: Hon Hai Precision Ind. Co., LTD, Taipei Hsien (TW)

(*) Notice: Subject to any disclaimer, the term of this patent is extended or adjusted under 35 U.S.C. 154(b) by 0 days.

(21) Appl. No.: 10/330,409

(22) Filed: Dec. 27, 2002

(65) Prior Publication Data
US 2004/0030515 A1 Feb. 12, 2004

(30) Foreign Application Priority Data
Aug. 8, 2002 (TW) ......................................... 91117843 A

(51) Int. Cl.[7] .............................................. G06F 19/00
(52) U.S. Cl. .......................... 702/81; 700/108; 702/84; 702/182
(58) Field of Search .............................. 702/79, 80, 81, 702/84, 168, 181, 182, 184; 700/33, 94, 169, 110, 108; 33/504, 505, 281, 284, 285

(56) References Cited

U.S. PATENT DOCUMENTS 5,991,706 A * 11/1999 Tsukamoto et al. ......... 702/182
6,161,079 A * 12/2000 Zink et al. .................. 702/168
6,622,101 B1 * 9/2003 Oechsner et al. ............. 702/84

* cited by examiner

Primary Examiner—Kamini Shah
(74) Attorney, Agent, or Firm—Wei Te Chung

(57) ABSTRACT

A system and method for measuring an object using different measurement apparatuses located at various measurement stations, and for gathering measurement data on the object automatically. The system comprises a plurality of measurement computers (100) located at a plurality of measurement stations (160) for executing measurement programs for the object and gathering measurement data on the object, a plurality of measurement apparatuses (120) linked with each measurement computer at each corresponding measurement station for measuring the object, a server (130) for storing various measurement programs for the object and measurement data on the object, and a data process computer (150) for collecting measurement data on the object gathered from the measurement apparatuses at the various measurement stations and for generating a measurement data report on the object.

9 Claims, 4 Drawing Sheets

SYSTEM AND METHOD FOR MEASURING AN OBJECT

BACKGROUND OF THE INVENTION

1. Field of the Invention

The present invention relates to a system and method for measuring an object, and particularly to a system and method for processing measurement data on an object.

2. Background of the Invention

Measurement technology has been developing for quite a long time. Humankind has devised various measurement devices to meet new demands for measurement as they arose. The rapid development of science and technology in recent history has driven scientists and engineers to develop even more advanced measurement technology. Inventors and technicians are continuously enhancing measurement devices, and increasingly incorporating manipulation of light, sound and electronics into measurement apparatus. To acquire measurement data on certain objects, complicated measurement apparatus are often needed.

An example of recent measurement technology is disclosed in U.S. Pat. No. 5,228,066, namely a system and method for measuring computer system time intervals. The system and method employ a circuit that can be implemented in a computer system for measuring a maximum and a minimum time interval for system elements to respond to a request for data or information. Another example is found in U.S. Pat. No. 5,015,867, which discloses apparatus and methods for measuring the diameter of a moving elongated material. The apparatus and methods use lasers and charged coupled devices to detect diffraction and interference patterns produced when electromagnetic radiation emitted from at least one laser is partially obscured by edges of the moving elongated material. Thus a variation in a diameter of the material is measured. There are numerous other measurement apparatus and methods disclosed in the prior art.

Although there are many known measurement apparatus and methods, few if any of them disclose a system and method for collecting and processing measurement data on an object efficiently. Conventional collection of measurement data is by hand. However, if an object is measured with various measurement apparatus at different measurement stations, collection of the measurement data by hand is particularly inconvenient and inefficient.

SUMMARY OF THE INVENTION

Accordingly, an object of the present invention is to provide a system and method which can measure various objects or various parts of an object at different measurement stations, and gather all measurement data automatically.

Another object of the present invention is to provide a system and method for measuring an object which can collect measurement data gathered from different measurement stations.

In order to accomplish the above-mentioned objects, the present invention provides a system for measuring an object using different measurement apparatuses located at various measurement stations, and for gathering measurement data on the object automatically. A preferred embodiment of the system comprises: a plurality of measurement computers located at a plurality of measurement stations for executing measurement programs for an object and gathering measurement data on the object, each measurement computer comprising a data obtaining module for gathering an operator code and a measurement apparatus code input by an operator, and a data process module for gathering measurement data on the object and determining whether the gathered measurement data exceed any design tolerance of the object; a plurality of measurement apparatuses linked with each measurement computer at each corresponding measurement station for measuring the object; a server comprising a program management module for querying, modifying, and storing various measurement programs for the object, and a data storing module for storing measurement data on the object; and a data process computer for collecting measurement data on the object gathered from the measurement apparatuses at the various measurement stations, and for generating a measurement data report on the object.

A preferred embodiment of a method of the present invention for measuring an object comprises the steps of: (i) providing a plurality of measurement computers located at a plurality of measurement stations for executing measurement programs for the object and gathering measurement data on the object, each measurement computer comprising a data obtaining module for gathering an operator code and a measurement apparatus code input by an operator, and a data process module for obtaining measurement data on the object and determining whether the measurement data exceed any design tolerance of the object; (ii) providing a plurality of measurement apparatuses linked with each measurement computer at each corresponding measurement station for measuring the object; (iii) providing a server comprising a data storing module for storing measurement programs for the object and measurement data on the object; and (iv) providing a data process computer for collecting measurement data on the object gathered from the various measurement stations, and for generating a measurement data report on the object.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Two expressions used hereinafter are defined as follows:

'Figure location' means a general location of a measured object in a figure.

'Parasitic error' means error caused by mistakes made during a procedure of measuring an object, which can be predefined according to statistical theory.

Figure 1:
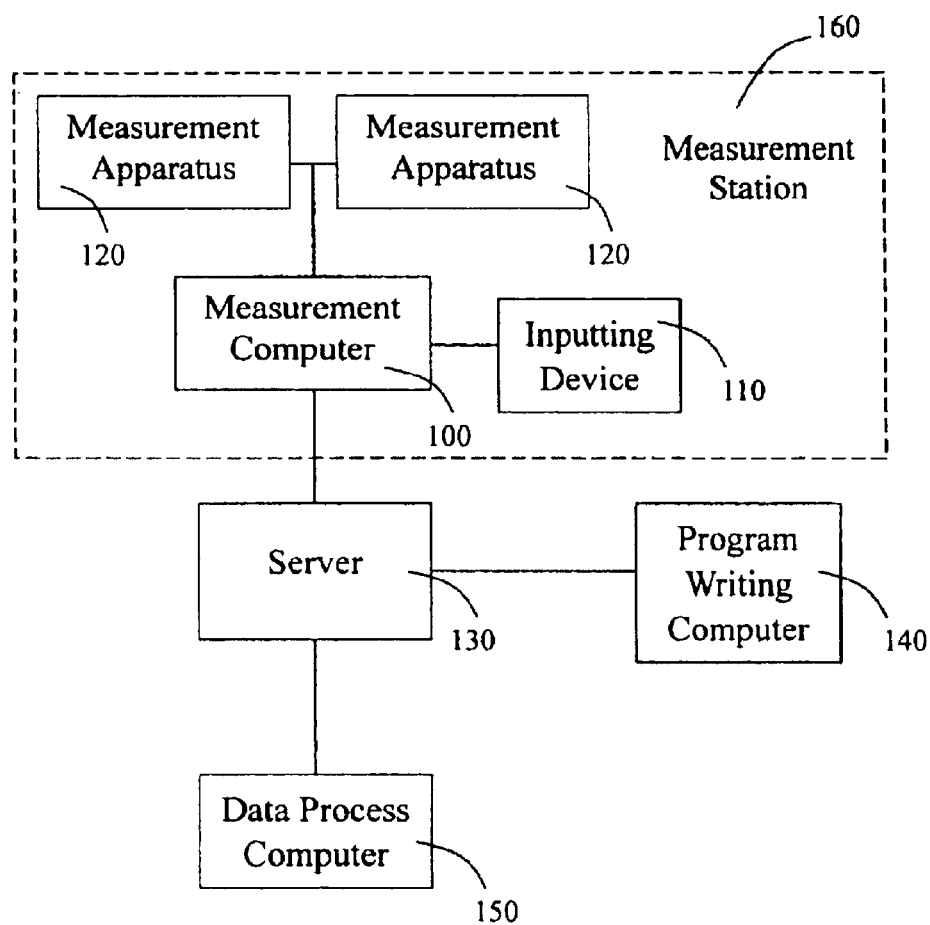
FIG. 1 is a schematic diagram of hardware infrastructure of an object measuring system in accordance with a preferred embodiment of the present invention.

FIG. 1 is a schematic diagram of hardware infrastructure of an object measuring system in accordance with a preferred embodiment of the present invention. The object measuring system comprises a plurality of measurement stations 160 (only one shown), a server 130, a program writing computer 140, and a data process computer 150.

Each measurement station 160 comprises a measurement computer 100 and a plurality of measurement apparatuses 120. The measurement computer 100 is electronically linked to the various measurement apparatuses 120 for transmitting data. In the preferred embodiment of the present invention, the measurement computer 100 is also linked to an inputting device 110. The inputting device 110 can input measurement data to the measurement computer 100. The inputting device 110 may, for example, be a keyboard.

The measurement computer 100 invokes object measurement programs in the server 130, which conduct measurement of an object using one or more of the measurement apparatuses 120. Each measurement apparatus 120 may be an electronic caliper, a precision height gauge, a profile projector, or a programmable 3D measuring machine. The measurement computer 100 obtains measurement data on the object from the various measurement apparatuses 120, or from the inputting device 110. When the measurement computer 100 obtains measurement data from the inputting device 110, the measurement data are input by an operator.

The server 130 is used for storing measurement data on various measured objects, measurement programs thereof, data on measurement apparatuses, and information on operators. The program writing computer 140 is used for designing and writing measurement programs for various objects, and for sending written measurement programs to the server 130 for storing. The data process computer 150 is used for collecting measurement data on an object gathered from different measurement stations, and for generating a measurement data report on the object.

Figure 2:
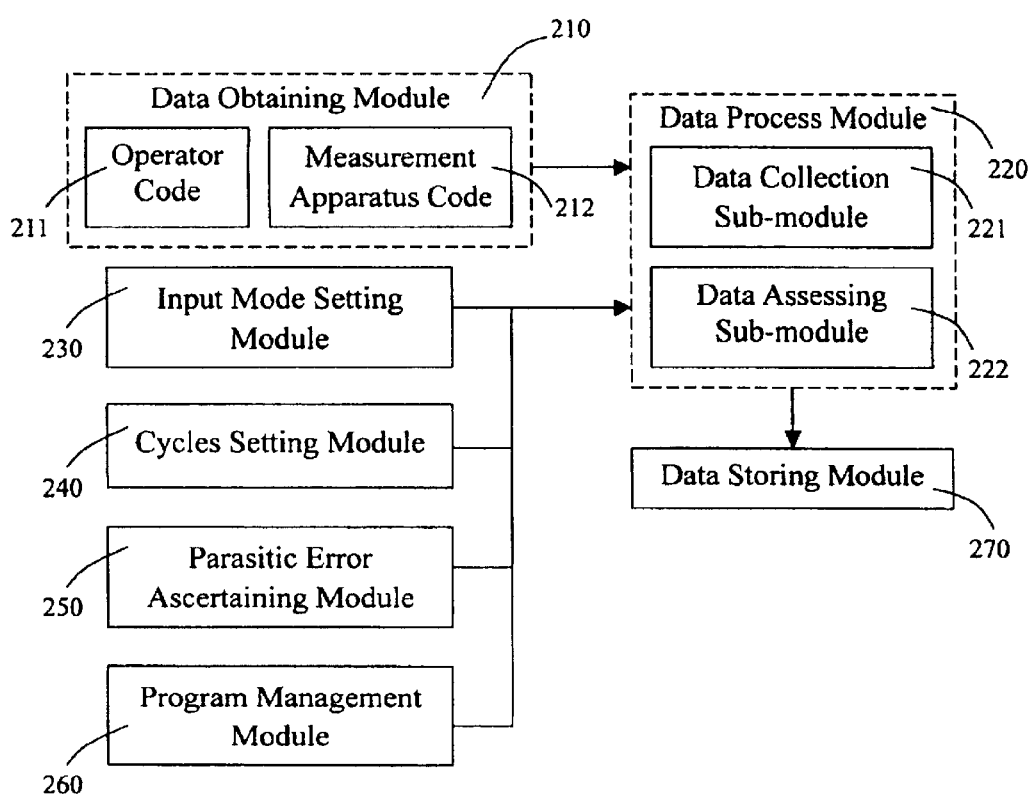
FIG. 2 is a schematic diagram of software infrastructure of the object measuring system in accordance with the preferred embodiment of the present invention.

FIG. 2 is a schematic diagram of software infrastructure of the object measuring system in accordance with the preferred embodiment of the present invention. The object measuring system comprises a data obtaining module 210, a data process module 220, an input mode setting module 230, a cycles setting module 240, a parasitic error ascertaining module 250, a program management module 260, and a data storing module 270. The data obtaining module 210, the data process module 220, the input mode setting module 230, the cycles setting module 240, and the parasitic error ascertaining module 250 are located in the measurement computer 100. The program management module 260 and the data storing module 270 are located in the server 130. The data obtaining module 210 is used for gathering an operator code 211 and a measurement apparatus code 212, which are input by an operator. The operator code 211 indicates which operator executes a measurement procedure. The measurement apparatus code 212 shows which measurement apparatuses are to be used. The data process module 220 is used for processing measurement data on an object received from the various measurement apparatuses 120. The data process module 220 comprises a data collection sub-module 221 and a data assessing sub-module 222. The data collection sub-module 221 is used for gathering measurement data on the object generated by the various measurement apparatuses 120. The data assessing sub-module 222 is used for determining whether the gathered measurement data exceed design tolerances of the object. The input mode setting module 230 is used for setting a mode of inputting the generated measurement data to the measurement computer 100. The cycles setting module 240 is used for setting the number of times that an object is to be measured. That is, an object is typically measured many times in order to obtain a relatively precise average measurement datum. The parasitic error ascertaining module 250 is used for determining whether the generated measurement data comprise parasitic error in the case where the generated measurement data exceed design tolerances. The program management module 260 is used for querying, modifying, and storing various measurement programs for the object. The data storing module 270 is used for storing the generated measurement data on the object.

Figure 3:
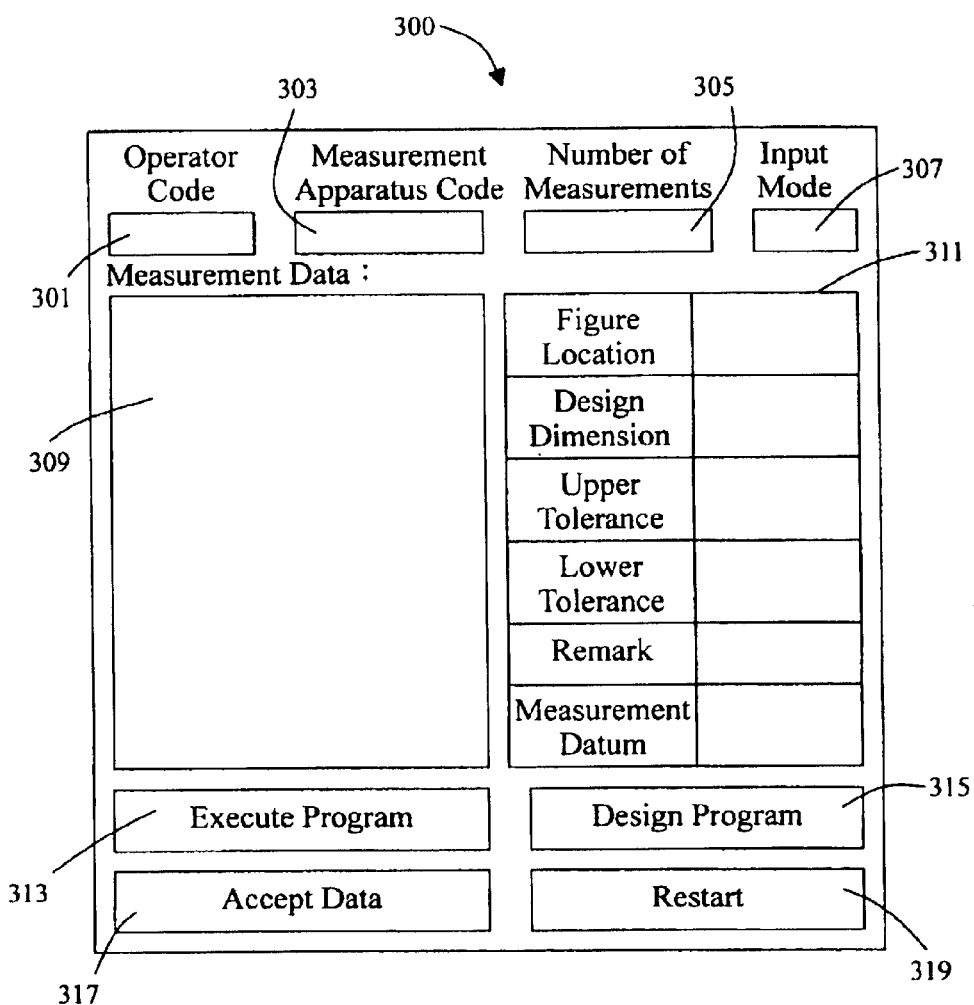
FIG. 3 schematically illustrates a working window of a measurement computer shown in FIG. 1.

FIG. 3 is an exemplary working window 300 of the measurement computer 100. For the purposes of explaining the present invention in as simple terms as practicable, it will hereinafter be assumed that only one measurement apparatus 120 is used. The working window 300 comprises an operator code blank 301, a measurement apparatus code blank 303, a number of measurements blank 305, an input mode blank 307, a measurement information list 309, a dimension information list 311, an "Execute Program" button 313, a "Design Program" button 315, an "Accept Data" button 317, and a "Restart" button 319. An operator inputs an operator code via the operator code blank 301, and inputs a measurement apparatus code via the measurement apparatus code blank 303. The number of measurements blank 305 is used for inputting the number of times that an object is to be measured. The input mode blank 307 is used for the operator to select a mode of measurement data to be input to the measurement computer 100. In the preferred embodiment of the present invention, the input mode blank 307 provides a drop-down menu for selecting an input mode. Modes that can be selected comprise inputting by hand, or direct transmission from the measurement apparatus 120 to the measurement computer 100. If the operator selects inputting by hand, the operator keys in gathered measurement data into the measurement computer 100 via the inputting device 110. If the operator selects direct transmission, when the measurement apparatus 120 generates measurement data on an object, the generated measurement data are directly transmitted to the measurement computer 100.

The measurement information list 309 shows measurement information on an object. The measurement information comprises measurement apparatus code, generated measurement datum, design dimension, design upper tolerance, design lower tolerance, and deviating value. The deviating value is an absolute value of a measurement datum minus a corresponding design dimension value. The dimension information list 311 is used for displaying information on a measurement datum when the measurement datum is generated by the measurement apparatus 120. The information on the measurement datum comprises a figure location, a design dimension, an upper tolerance, a lower tolerance, a remark, and a measurement datum.

When an operator begins to measure an object, he/she can click the "Execute Program" button 313 for selecting a measurement program that is suitable for measuring the object. If there is no suitable measurement program for the object, the operator can click the "Design Program" button 315 to request a program designer to write a measurement program for the object. The program designer writes the measurement program suitable for the object in the program writing computer 140, and transmits the measurement program to the server 130. Then the operator invokes the measurement program via the measurement computer 100 to measure the object. When a measurement datum is generated by the measurement apparatus 120 and displayed in the measurement datum blank in the dimension information list 311, the operator can decide whether or not to accept the measurement datum. If the data assessing sub-module 222 determines that the measurement datum does not exceed a design tolerance, the operator can accept the measurement datum by clicking the "Accept Data" button 317. If the data assessing sub-module 222 determines that the measurement datum exceeds the design tolerance, and/or if the parasitic error ascertaining module 250 determines that the measurement datum comprises parasitic error, the operator can click the "Restart" button 319. The operator thereby abandons the measurement datum and requires the measurement apparatus 120 to generate a new measurement datum on the object. If and when the operator accepts a generated measurement datum, the operator may start a next measurement procedure by clicking the "Restart" button 319.

Figure 4:
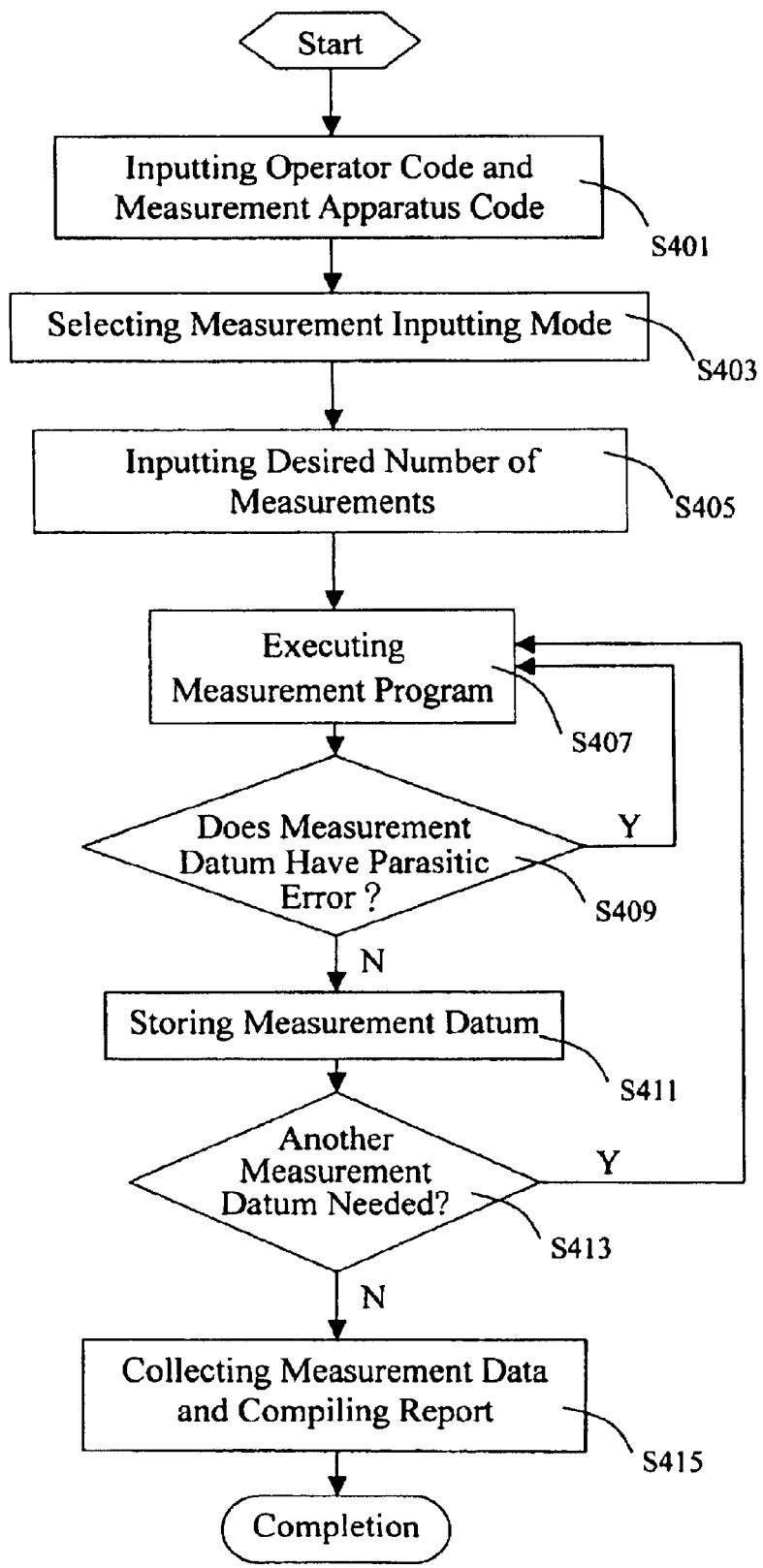
FIG. 4 is a flow chart of measuring an object in accordance with a preferred embodiment of the present invention.

FIG. 4 is a flow chart of measuring an object in accordance with a preferred embodiment of the present invention. To begin a measurement procedure, at step S401, an operator executing the measurement procedure inputs an operator code and a measurement apparatus code to the data obtaining module 210. At step S403, the operator inputs a desired measurement inputting mode via the input mode blank 307, and the input mode setting module 230 sets the desired mode accordingly. At step S405, the measurement computer 100 invokes a measurement program on the object from the server 130. The operator inputs a desired number of times that the object is to be measured via the number of measurements blank 305, and the cycles setting module 240 sets the desired number of times accordingly. At step S407, the measurement computer 100 executes the invoked measurement program to measure the object, and the measurement apparatus 120 generates measurement data on the object. In the preferred embodiment of the present invention, when a new measurement datum is generated, information on the measurement datum is displayed in the dimension information list 311. Such information includes the generated measurement datum itself, figure location, design dimension, upper tolerance, and lower tolerance. At step S409, the data assessing sub-module 222 determines whether a generated measurement datum on the object exceeds a corresponding design tolerance of the object. If the measurement datum exceeds the corresponding design tolerance, the parasitic error ascertaining module 250 determines whether the generated measurement datum comprises parasitic error. If the generated measurement datum comprises parasitic error, the parasitic error ascertaining module 250 advises the operator to measure the object again at step S407. If the operator cannot obtain a measurement datum that does not comprise parasitic error even after repeated attempts, the generated measurement datum comprising parasitic error is displayed in the measurement information list 309 in a distinguishing color. At step S411, the generated measurement datum is stored in the server 130.

After obtaining a measurement datum, at step S413, the measurement computer 100 determines whether there is another measurement datum that needs to be obtained according to the invoked measurement program. If there is another measurement datum that needs to be obtained, the measurement computer 100 returns to step S407, and continues to operate according to the applicable above-described steps.

If and when all needed measurement data are obtained and stored in the server 130, then in step S415 the operator collects measurement data that are related to each other to compile a measurement data report via the data process computer 150. An example of measurement data that are related to each other is measurement data on a same object.

While the invention has been described above, it should be understood that it has been presented by way of example only and not by way of limitation. Thus the breadth and scope of the present invention should not be limited by the above-described exemplary embodiments, but should be defined only in accordance with the following claims and their equivalents.

What is claimed is:

1. An object measuring system for measuring an object at different measurement stations, the object measuring system comprising:

at least one measurement computer located at at least one measurement station for executing measurement programs for an object and gathering measurement data on the object, the at least one measurement computer comprising a data obtaining module for gathering an operator code and a measurement apparatus code input by an operator, and a data process module for gathering measurement data on the object and determining whether the gathered measurement data exceed any design tolerance of the object;

at least one measurement apparatus linked with the at least one measurement computer at the at least one measurement station for measuring the object;

a server comprising a program management module for querying, modifying, and storing measurement programs for the object, and a data storing module for storing measurement data on the object; and a data process computer for collecting measurement data on the object gathered from the at least one measurement station, and for generating a measurement report on the object.

2. The object measuring system as claimed in claim 1, further comprising a program writing computer for designing and writing measurement programs for an object.

3. The object measuring system as claimed in claim 1, further comprising at least one inputting device at the at least one measurement station, for inputting measurement data on the object to the at least one measurement computer at the at least one measurement station.

4. The object measuring system as claimed in claim 1, wherein the at least one measurement computer further comprises an input mode setting module for setting a mode of inputting measurement data to the at least one measurement computer.

5. The object measuring system as claimed in claim 4, wherein modes of inputting measurement data comprise inputting by hand, and direct transmission from the at least one measurement apparatus to the at least one measurement computer.

6. The object measuring system as claimed in claim 1, wherein the at least one measurement computer further comprises a parasitic error ascertaining module for determining whether measurement data on an object comprise parasitic error if the measurement data exceed any design tolerance of the object.

7. The object measuring system as claimed in claim 1, wherein the at least one measurement computer further comprises a cycles setting module for setting a number of times that an object is to be measured.

8. The object measuring system as claimed in claim 1, wherein the at least one measurement apparatus comprises any one or more of the following:

an electronic caliper, a precision height gauge, a profile projector, and a programmable 3D measuring machine.

9. A method of monitoring and measuring a same working piece during a whole machining process, comprising steps of:

providing a series of measuring stations associated with a series of work stations;

equipping said measuring stations with computers;

equipping said measuring stations with different measuring apparatuses linked to the corresponding computers, respectively, corresponding to different structural characters of the machined working piece after the corresponding work stations;

executing different measuring programs on the computers at said different measuring stations, according to the different measuring apparatuses;

collecting measurement results from all the measuring stations; and examining the collected measurement results to see whether the machined working piece is within tolerances at said different measuring stations and/or further determine whether adjustments should be performed at the work stations.

* * * * *